(12) United States Patent
Aumasson

(10) Patent No.: US 9,219,606 B2
(45) Date of Patent: Dec. 22, 2015

(54) METHOD AND DEVICE FOR DIGITAL DATA BLOCKS ENCRYPTION AND DECRYPTION

(71) Applicant: NAGRAVISION S.A., Cheseaux-sur-Lausanne (CH)

(72) Inventor: Jean-Philippe Aumasson, Vuibroye (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/433,517

(22) PCT Filed: Oct. 3, 2013

(86) PCT No.: PCT/EP2013/070610
§ 371 (c)(1),
(2) Date: Apr. 3, 2015

(87) PCT Pub. No.: WO2014/053589
PCT Pub. Date: Apr. 10, 2014

(65) Prior Publication Data
US 2015/0263858 A1  Sep. 17, 2015

Related U.S. Application Data

(60) Provisional application No. 61/709,996, filed on Oct. 5, 2012.

(30) Foreign Application Priority Data

Oct. 5, 2012 (EP) .................................... 12187340

(51) Int. Cl.
*H04L 29/06* (2006.01)
*H04L 9/30* (2006.01)
*H04L 9/06* (2006.01)
*H04L 9/14* (2006.01)

(52) U.S. Cl.
CPC ............ *H04L 9/30* (2013.01); *H04L 9/0637* (2013.01); *H04L 9/14* (2013.01); *H04L 2209/24* (2013.01)

(58) Field of Classification Search
CPC ........... H04L 9/0637; H04L 9/14; H04L 9/30; H04L 2209/24
See application file for complete search history.

(56) References Cited

U.S. PATENT DOCUMENTS

| 5,684,876 A | 11/1997 | Pinder et al. |
| 8,345,713 B2 | 1/2013 | Zhang |

(Continued)

FOREIGN PATENT DOCUMENTS

| GB | 2447563 A | * 9/2008 | ................ H04L 9/06 |
| WO | WO 97/18654 | 5/1997 | |
| WO | WO 2008/052141 | 5/2008 | |

OTHER PUBLICATIONS

International Search Report issued in International Application No. PCT/EP2013/070610, dated May 11, 2013.

(Continued)

*Primary Examiner* — Jeffrey Pwu
*Assistant Examiner* — Thong Truong
(74) *Attorney, Agent, or Firm* — DLA Piper LLP US

(57) ABSTRACT

Method and System for encrypting plaintext digital data divided into a sequence comprising successive plaintext blocks of a same length of bits each and a residual plaintext block having a length of bits lower than the length of one of the successive plaintext blocks. The successive plaintext blocks are ciphered with the main encryption key by using a ciphering algorithm based on a cipher block chaining mode to obtain a sequence of successive ciphered blocks having the same length as the successive plaintext blocks. A set of round keys having a same length, are generated by applying a key schedule function on a string obtained by adding the last ciphered block to the main encryption key. The round keys of the set are added together to obtain a resulting string having a length equal to the length of a block of the sequence. The residual plaintext block is then added to the most left bits of the resulting string forming a string) having a length equal to the length of the residual block to obtain a residual ciphered block. The method and the system apply also to decipher a sequence of successive ciphered blocks followed by a residual ciphered block.

16 Claims, 4 Drawing Sheets

(56) References Cited

U.S. PATENT DOCUMENTS

2006/0062389 A1 3/2006 Mukherjee et al.
2008/0101414 A1 5/2008 Zhang
2010/0150344 A1* 6/2010 Karroumi et al. .............. 380/45

OTHER PUBLICATIONS

Written Opinion issued in International Application No. PCT/EP2013/070610, dated May 11, 2013.

Morris Dworkin, "Recommended for Block Cipher Modes of Operation: Three Variants of Ciphertext Stealing for CBC Mode", Addendum to NIST Special Publication 800-38A, Oct. 2010 (12 pages).

"Residual Block Termination", printed from https://en.wikipedia.org/wiki/Residual_block_termination, last updated Jan. 6, 2014 (1 page).

"Ciphertext Stealing", printed from https://en.wikipedia.org/wiki/Ciphertext_stealing#CBC_encryption_steps, last modified Jun. 11, 2015 (6 pages).

* cited by examiner

METHOD AND DEVICE FOR DIGITAL DATA BLOCKS ENCRYPTION AND DECRYPTION

CROSS REFERENCE TO RELATED APPLICATIONS

This application is a U.S. National Stage Application of International Application No. PCT/EP2013/070610 filed Oct. 3, 2013, which claims priority to European Patent Application No. 12187340.0 filed Oct. 5, 2012 and U.S. Provisional Patent Application No. 61/709,996 filed Oct. 5, 2012.

FIELD OF THE INVENTION

The invention relates to a method and device for encryption and decryption of digital data divided into a plurality of blocks of a same length and a residual block having a smaller length. The method may be applied on access controlled data packets of broadcast multimedia services in the field of pay TV.

TECHNICAL BACKGROUND

A known method for encrypting a sequence of data blocks consists of a Cipher Block Chaining (CBC) process where each block of plaintext is combined with the preceding ciphertext block by using XOR operation before being encrypted. Each ciphertext block is thus dependent on all plaintext blocks processed before a given block. When the total length of the plaintext is not a multiple of the blocks length, a residual block of shorter length remains, an embodiment of the CBC process called Residual Block Termination is applied. The plaintext full blocks of the same length are encrypted by using the CBC mode except the last full block which is encrypted twice. Ciphered full blocks of a same length are thus obtained. The residual block of plaintext is XORed with leftmost bits of the re-encrypted last full block to obtain a ciphered residual block. At decryption, first the ciphered full blocks are decrypted by using the CBC mode. The last full block which is still encrypted is re-encrypted and the residual ciphered block is XORed with the leftmost bits of the re-encrypted last full block to obtain the complete plaintext.

The document "Recommendation for Block Cipher Modes of Operation: Three Variants of Ciphertext Stealing for CBC Mode", Addendum to NIST Special Publication 800-38A, Morris Dworkin, October 2010 discloses three variants of Ciphertext Stealing mode based on CBC mode.

The three variants of CBC mode accept any plaintext input whose bit length is greater than or equal to the block size, whether or not the length is a multiple of the block size. Unlike the padding methods discussed in NIST SP 800-38A, Ref. [1], these variants avoid ciphertext expansion.

These variants are denoted CBC-CS1, CBC-CS2, and CBC-CS3, where "CS" indicates "ciphertext stealing," because when padding bits are needed in these variants, they are taken from the penultimate ciphertext block. The variants differ only in the ordering of the ciphertext bits.

The known methods of blocks ciphering can be summarized as follow:

| Method | Computation | In-order | Enc & dec | Security | Prop. Diff. | Simplicity |
|---|---|---|---|---|---|---|
| A) Residual block termination | 1 encryption | Yes | Yes, for decryption | Medium | Yes | Medium |
| B) Ciphertext stealing | 1 enc. or dec. Split and swap | No | No | High | Yes | Low |
| C) Clear residue | None | Yes | No | Null | No | High |
| D) XOR with a constant | 1 encryption (possibly precomputed) | Yes | Yes, for decryption | Low | No | High |

The grey cells show the drawbacks of the prior art methods A), B), C) and D).

A). Residual block termination (folklore, see e.g. "Residual block termination", Wikipedia, http:en.wikipedia.org/wiki/Residual_block_termination): the residue is XORed with the encryption of the last full encrypted block, which requires the use of the encryption function for decrypting a plaintext.

B). Ciphertext stealing (folklore, see e.g. U.S. Pat. No. 5,684,876, or "Ciphertext stealing", Wikipedia: http:en.wikipedia.org/wiki/Ciphertext_stealing#CBC_encryption_steps): the penultimate encrypted block having a length of x bits is split in y and (x-y) bits parts, the latter being concatenated to the residue of y bits before encryption and swap of the x bits result with the previous y bit part. It is the least simple method, for it requires splitting a block and out-of-order blocks processing.

C). Clear residual data: a solution sometimes adopted is to leave the y bits residue in clear, i.e. without any confidentiality protection. This is the simplest but least secure method.

D). XOR with constant: this method consists in XORing the residue with a key-dependent constant, such as the encryption of the initialization vector IV (as found in an IPTV scrambler, see e.g. ATIS-0800006: IIF Default Scrambling Algorithm (IDSA)—IPTV Interoperability Specification. ATIS, January 2007). It has a low security, as the knowledge of one plaintext ciphertext pairs make the method equivalent to method C) (because the constant used is then known).

Document WO2008052141A2 discloses a method and apparatus for improved scrambling and/or descrambling of MPEG-2 transport stream packets over an Internet Protocol network. To scramble the transport packet streams Advance Encryption Standard (AES) under cipher block chaining (CBC) is used, wherein computation of an initialization vector (IV) set to either a constant number or to a programmable random number is performed.

SUMMARY OF THE INVENTION

The present invention aims to overcome the highlighted drawbacks of the prior methods by providing a more efficient method to encrypt a plurality of plaintext blocks having a same length and a residual block of a shorter length by minimizing calculation processing capabilities while maintaining an acceptable security level.

The aims are achieved by a method for encrypting plaintext digital data divided into a sequence comprising N successive blocks of a same length of x bits each and a residual plaintext block having a length of y bits lower than the length of one of the N successive blocks, the method comprising preliminary step of:
a) inputting the sequence of N successive plaintext blocks into a pre-processing module comprising at least a ciphering module, an addition module, registers and a memory containing a main encryption key, the addition module applying logical XOR operation carried out bitwise;
b) ciphering the N successive plaintext blocks with the main encryption key by using an encryption algorithm based on a cipher block chaining mode where the first block is added to an initialization vector and each following plaintext block is added to the preceding ciphered block before being encrypted with the main encryption key, obtaining a sequence of N successive ciphered blocks of the same length than the plaintext blocks;
the method is characterized in that it further comprises steps of:
c) generating a set of round keys having a same length by applying a key schedule function on a string obtained by adding the last ciphered block to the main encryption key;
d) adding together by the addition module all or part of the round keys of the set, obtaining a resulting string having a length equal to the length of a block;
e) adding to the residual plaintext block the most left bits of the resulting string forming a string having a length equal to the length of the residual block, obtaining a residual ciphered block;
f) outputting the sequence including the previously obtained N successive ciphered blocks followed by the residual ciphered block.

A further object of the invention is a system configured to encrypt plaintext digital data divided into a sequence comprising N successive blocks of a same length of x bits each and a residual plaintext block having a length of y bits lower than the length of one of the N successive blocks, comprising:
a) a pre-processing module comprising at least a ciphering module, an addition module, registers and a memory containing a main encryption key, the preprocessing module being adapted to receive the sequence of N successive plaintext blocks at an input, the addition module applying logical XOR operation carried out bitwise;
b) the ciphering module being configured to cipher the N successive plaintext blocks with the main encryption key by using an encryption algorithm based on a cipher block chaining mode where the first block is added to an initialization vector and each following plaintext block is added to the preceding ciphered block before being encrypted with the main encryption key, to obtain a sequence of N successive ciphered blocks of the same length than the plaintext blocks;
the system is characterized in that it further comprises:
c) a generator being configured to generate a set of round keys having a same length by applying a key schedule function on a string obtained by adding the last ciphered block to the main encryption key;
d) the addition module being configured to add together all or part of the round keys of the set to obtain a resulting string having a length equal to the length of a block;
e) and to add the residual plaintext block to the most left bits of the resulting string forming a string having a length equal to the length of the residual block to obtain a residual ciphered block;
f) the pre-processing module being further configured to produce the sequence including the N successive ciphered blocks followed by the residual ciphered block at an output.

In a preferred embodiment, the mathematical operations as encryption, decryption, XOR are executed mostly with hardware modules known for their high speed and high reliability calculation performances relative to software program modules.

In order to improve security, the ciphering algorithm is based on a cipher block chaining mode using an initialization vector for encrypting the first plaintext block. In this mode, a block of a sequence of ciphered blocks depends on all blocks ciphered before the block in question.

The key schedule function or other function producing sub keys based on a main encryption or decryption key is a component common to the encryption and decryption process. This function maps a key to a set of round keys also called sub-keys mostly in a pseudo-random way.

When two devices communicate, it is often undesirable that they implement both the encryption and decryption function, for security reasons. For example, when a smart card communicates sensitive data to a television set-top-box, we may have that
1. the encryption hardware on the set-top-box should not be usable to forge fake data from a smart card, and
2. the smart card has limited hardware and/or memory, thus requiring minimal space for cryptographic functions.

Also, in such cases in-order processing is preferable, as it makes data transmission more efficient. A reasonable security level should be provided, thus differences propagation is clearly preferable. The table below shows differences between the method of the invention and the methods of the prior art presented in above technical background section.

| Method | Computation | In-order | Enc & dec | Security | Prop. Diff. | Simplicity |
|---|---|---|---|---|---|---|
| Method of the invention | One key schedule function | Yes | No | medium | Yes | Medium |

BRIEF DESCRIPTION OF THE DRAWINGS

The invention will be better understood with the following detailed description, which refers to the attached figures given as non-limitative examples.

DETAILED DESCRIPTION OF THE INVENTION

The digital data of the plaintext to encrypt are divided into a sequence ($P_1$, $P_2$, $P_3$, . . . , $P_N$) of N blocks having each a same length of x bits and a residual block PR having a length of y bits smaller than the length of a block of the sequence ($P_1$, $P_2$, $P_3$, . . . , $P_N$).

In a similar way, ciphertext data ($C_1$, $C_2$, $C_3$, . . . , $C_N$) encrypted by the method of the invention are also divided into N blocks having each a same length of x bits and a ciphered residual block CR which length of y bits is smaller than the length of a block of the sequence ($C_1$, $C_2$, $C_3$, . . . , $C_N$). The ciphered blocks of the sequence as well as the residual ciphered block CR have a length equal to the length of the corresponding plaintext blocks of the sequence and the residual plaintext block PR.

In the following description, the combination of blocks corresponds to XOR operation performed on the various blocks by an addition module (AM) implemented in the pre-processing module.

Encryption

Figure 1:
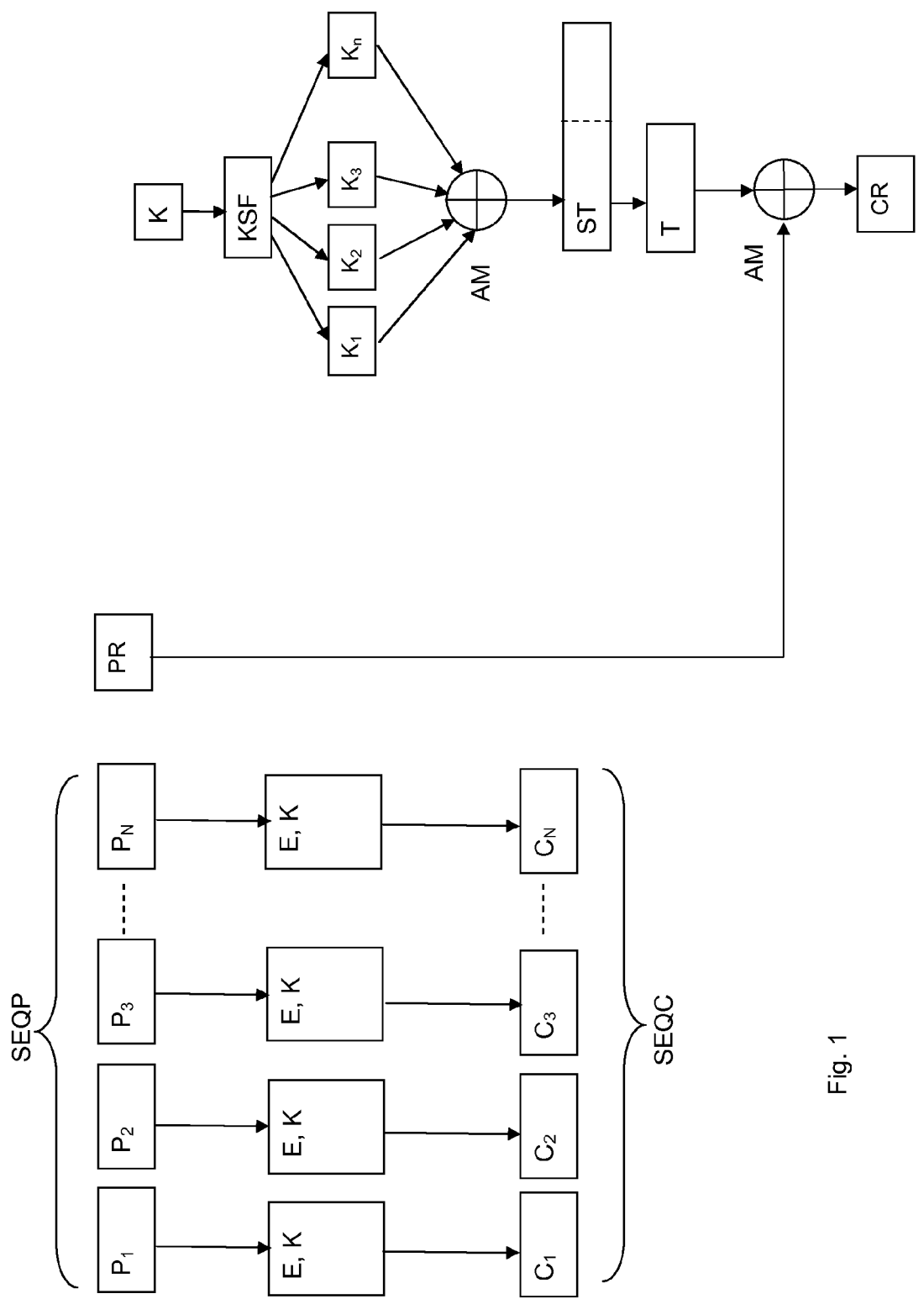
FIG. 1 shows a block diagram of a first embodiment of the method of the invention where N successive plaintext blocks of a same length are encrypted and the residual plaintext block is combined with a string formed by an addition of round keys obtained by applying a key schedule function on the encryption key.

In the encryption process illustrated by FIG. 1, the sequence SEQP of N plaintext blocks ($P_1$, $P_2$, $P_3$, . . . , $P_N$) is entered into a pre-processing module comprising hardware and software modules, such as registers, multipliers, addition modules, inverters controlled by a processor. The pre-processing module carries out first processing steps by executing successive encryption (E, K) by using an algorithm E with an encryption key K on the N input plaintext blocks sequence ($P_1$, $P_2$, $P_3$, . . . , $P_N$) and obtains a sequence of ciphered blocks ($C_1$, $C_2$, $C_3$, . . . , $C_N$).

A second processing step is carried out on the plaintext residual block PR which is "ciphered" with a binary string T issued from the encryption key K used to encrypt the plaintext blocks ($P_1$, $P_2$, $P_3$, . . . , $P_N$). The pre-processing module generates round keys ($K_1$, $K_2$, $K_3$, . . . ; $K_n$) by using a component or a function common to encryption and decryption as for example a key schedule function KSF applied on the encryption key K. These round keys ($K_1$, $K_2$, $K_3$, . . . ; $K_n$) are combined together, i.e. successive addition (XOR operations) on all or part of the round keys ($K_1$, $K_2$, $K_3$, . . . ; $K_n$) to obtain a string $ST = K_1 \oplus K_2 \oplus K_3 \oplus \ldots K_n$. The length of the string ST is equal to the length of a block of the sequence SEQP, i.e. x bits. In general, the encryption key K has also a length of at least x bits.

As the length of the residual plaintext block PR is lower than the one of the blocks of the sequence SEQP, the string ST is truncated by removing most right bits to keep y most left bits corresponding to the length of the plaintext residual block PR. The resulting string T is added (XOR operation) to the plaintext residual block PR to obtain a ciphered residual block CR having a length of y bits, $CR = PR \oplus T$.

The pre-processing module thus outputs a sequence SEQC of N ciphered blocks ($C_1$, $C_2$, $C_3$, . . . , $C_N$) followed by the ciphered residual block CR.

Figure 3:
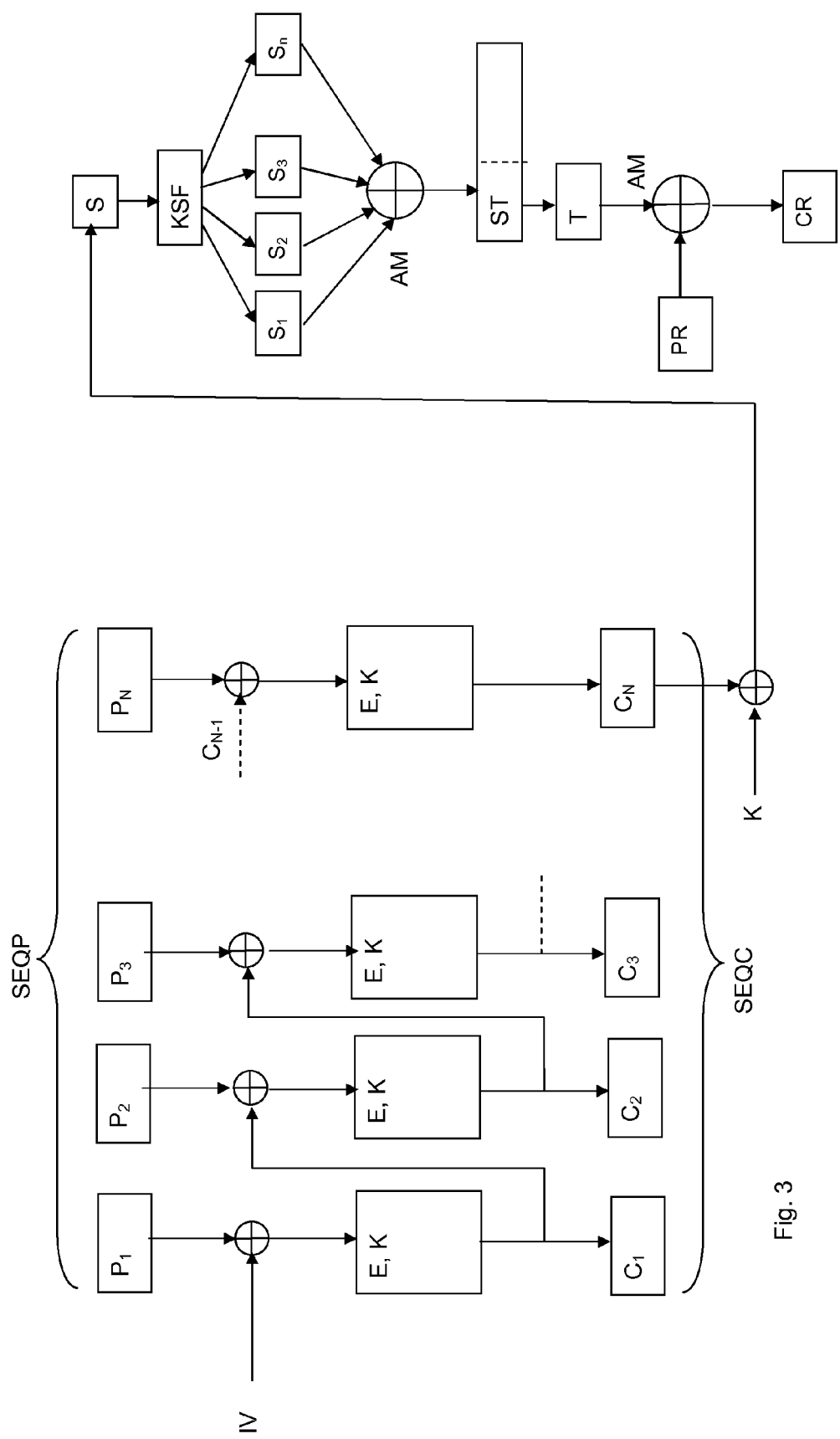
FIG. 3 shows a block diagram of a second embodiment of the method of the invention where N successive plaintext blocks of a same length are encrypted in a chaining mode and the residual plaintext block is combined with a string formed by a combination of round keys obtained by applying a key schedule function on a combination of the encryption key with the last ciphered block to obtain a residual ciphered block.

According to a preferred embodiment improving security, the ciphering algorithm is based on a cipher block chaining (CBC) mode where the first plaintext block $P_1$ is added to an initialization vector IV and each following plaintext block $P_2$, . . . $P_N$ is added to the preceding ciphered block $C_1$ . . . $C_{N-1}$ before being encrypted with the key K as illustrated by FIG. 3. The initialization vector IV may be random, variable or constant.

The sequence SEQP of N successive plaintext blocks ($P_1$, $P_2$, $P_3$, . . . , $P_N$) is entered into the pre-processing module (PM) which ciphers the N successive plaintext blocks ($P_1$, $P_2$, $P_3$, . . . , $P_N$) with the main encryption key (K) by using the cipher block chaining (CBC) mode and a predefined encryption algorithm. A sequence SEQC of N successive ciphered blocks ($C_1$, $C_2$, $C_3$, . . . $C_N$) of the same length than the plaintext blocks ($P_1$, $P_2$, $P_3$, . . . , $P_N$) is thus obtained.

The round keys ($S_1$, $S_2$, $S_3$, . . . $S_n$) are generated by applying for example a key schedule function (KSF) on a string (S) obtained by adding the last ciphered block ($C_N$) to the encryption key (K), $S = C_N \oplus K$ (XOR operation). The length of the round keys ($S_1$, $S_2$, $S_3$, . . . $S_n$) is preferably equal to the length of the ciphered blocks of the sequence SEQC.

These round keys ($S_1$, $S_2$, $S_3$, . . . ; $S_n$) are combined together, i.e. successive addition (XOR operations) on all or part of the round keys ($S_1$, $S_2$, $S_3$, . . . ; $S_n$) to obtain a string $ST = S_1 \oplus S_2 \oplus S_3 \oplus \ldots S_n$ having a length equal to the length of a block of the sequence SEQP, To obtain the ciphered residual block CR, the residual plaintext block (PR) is added to the most left bits of the string ST forming a string T having a length of y bits equal to the length of the residual plaintext block (PR), $CR = PR \oplus T$.

As in the preceding embodiment, the pre-processing module thus outputs a sequence SEQC of N ciphered blocks ($C_1$, $C_2$, $C_3$, . . . $C_N$) followed by the ciphered residual block CR.

The advantage of this embodiment using CBC mode is that each ciphered block depends on all plaintext blocks processed before a given block. An error in one block propagates in all following blocks including the residual block.

Decryption

Figure 2:
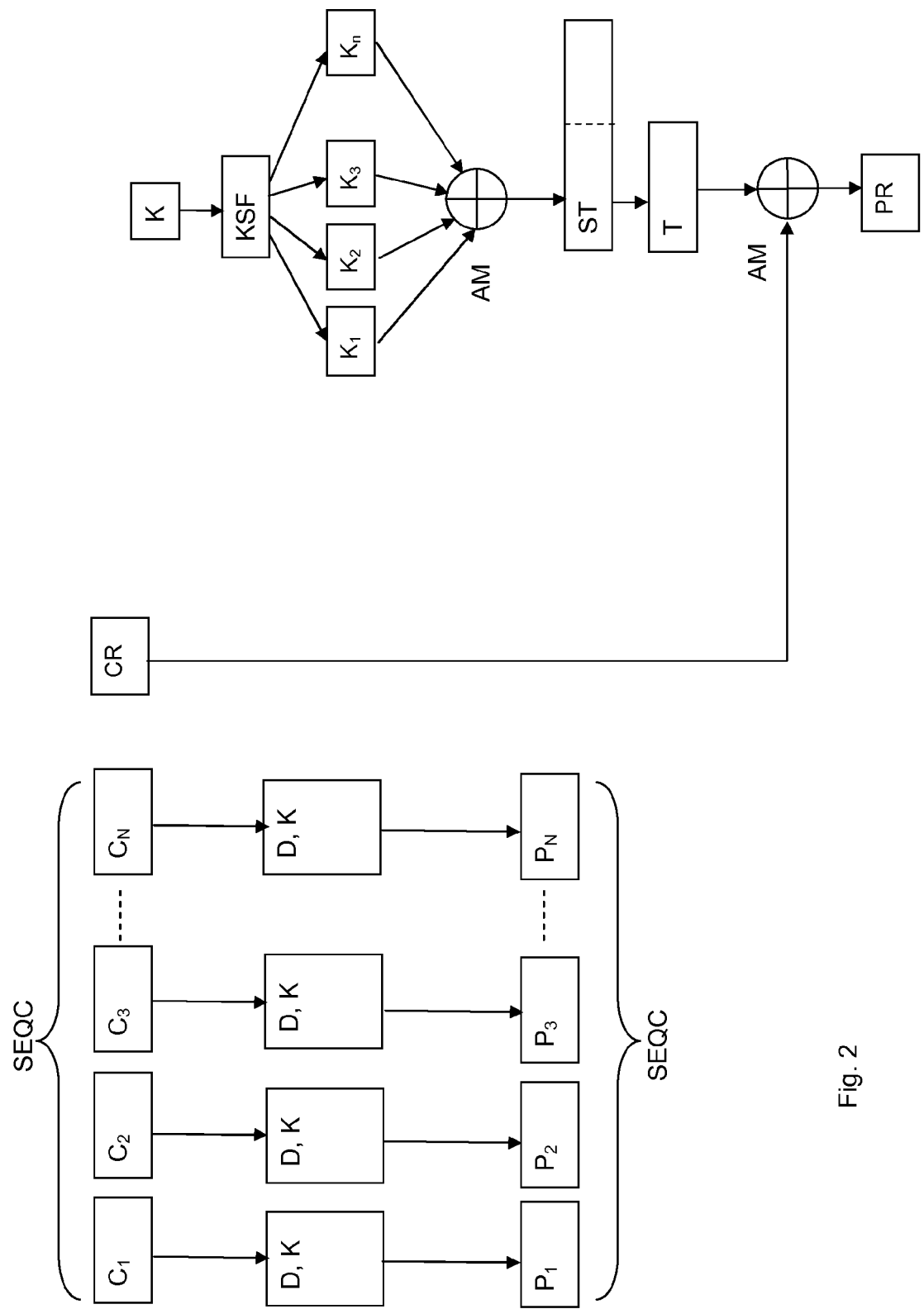
FIG. 2 shows a block diagram of the embodiment of FIG. 1 where the N successive ciphered blocks are decrypted and the residual ciphered block is combined with a string formed by a combination of round keys obtained by applying a key schedule function on the encryption key.

In the decryption process illustrated by FIG. 2, the sequence SEQC of N ciphered blocks ($C_1$, $C_2$, $C_3$, . . . $C_N$) is entered into a pre-processing module comprising hardware and software modules, such as registers, multipliers, addition modules, inverters controlled by a processor. The pre-processing module carries out first processing steps by executing successive decryption (D, K) by using an algorithm D inverse of the encryption algorithm E with an encryption key K on the N input ciphered blocks sequence ($C_1$, $C_2$, $C_3$, . . . $C_N$) and obtains a sequence of plaintext blocks ($P_1$, $P_2$, $P_3$, . . . , $P_N$).

The ciphered residual block CR is "decrypted" with a binary string T issued from the encryption key K used to decrypt the ciphered blocks ($C_1$, $C_2$, $C_3$, . . . $C_N$). The preprocessing module generates round keys ($K_1, K_2, K_3, \ldots; K_n$) by using the same component or function as for the encryption, for example a key schedule function KSF applied on the encryption key K. These round keys ($K_1, K_2, K_3, \ldots; K_n$) are combined together, i.e. successive addition (XOR operations) on all or part of the round keys ($K_1, K_2, K_3, \ldots; K_n$) to obtain a string $ST=K_1 \oplus K_2 \oplus K_3 \oplus \ldots K_n$. The length of the string ST is equal to the length of a block, i.e. x bits. In general, the encryption key K has a length of at least x bits corresponding to the one of the blocks of the sequence SEQC.

As the length of the residual ciphered block CR is lower than the one of the blocks of the sequence SEQC, the string ST is truncated by removing most right bits to keep y most left bits corresponding to the length of the ciphered residual block CR. The resulting string T is added (XOR operation) to the ciphered residual block CR to obtain a plaintext residual block PR having a length of y bits, $PR=CR \oplus T$.

Thanks to the XOR operation having an inverse equal to XOR operation itself, when the ciphered residual block $CR=PR \oplus T$, then the plaintext residual block $PR=CR \oplus T$.

The pre-processing module thus outputs a sequence SEQP of N plaintext blocks ($P_1, P_2, P_3, \ldots, P_N$) followed by the plaintext residual block PR.

Figure 4:
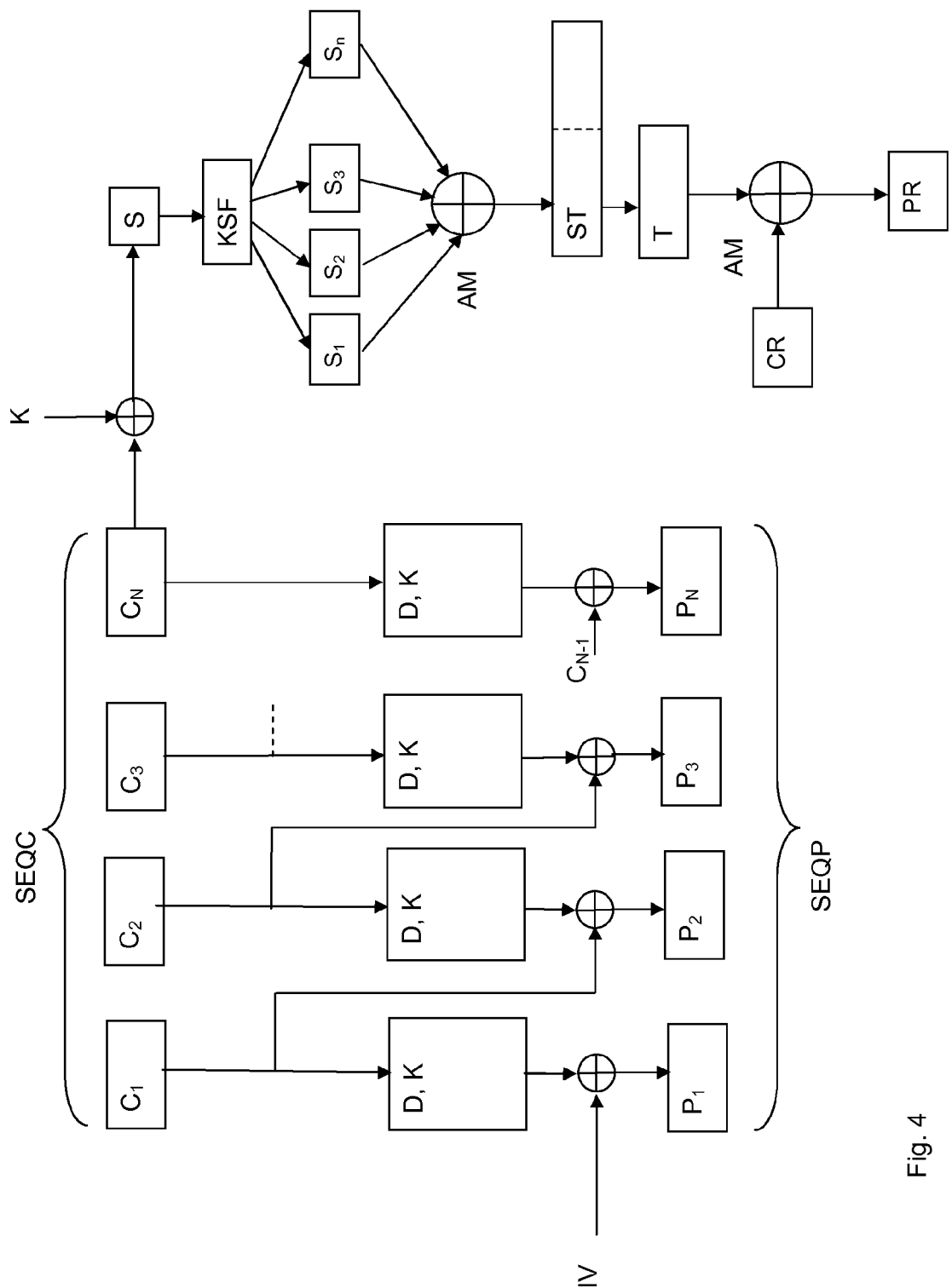
FIG. 4 shows a block diagram of the embodiment of FIG. 3 where the N successive ciphered blocks are decrypted in a chaining mode and the residual ciphered block is combined with a string formed by a combination of round keys obtained by applying a key schedule function on a combination of the encryption key with the last ciphered block to obtain a residual plaintext block.

According to the preferred embodiment where the deciphering algorithm is based on a cipher block chaining (CBC) mode the first ciphered block C1 once decrypted is added to the initialization vector IV to obtain the first plaintext block P1. Each ciphered block $C_1, \ldots C_{N-1}$ except the last ciphered block $C_N$ is added to the following decrypted block to obtain the plaintext blocks P2, . . . PN as illustrated by FIG. 4.

The sequence SEQc of N successive ciphered blocks ($C_1, C_2, C_3, \ldots C_N$) is entered into the pre-processing module (PM) which deciphers the N successive ciphered blocks ($C_1, C_2, C_3, \ldots C_N$) with the main encryption key (K) by using the cipher block chaining (CBC) mode and a predefined decryption algorithm D inverse of the encryption algorithm E. A sequence SEQP of N successive plaintext blocks ($P_1, P_2, P_3, \ldots P_N$) of the same length than the ciphered blocks ($C_1, C_2, C_3, \ldots C_N$) is thus obtained.

The round keys ($S_1, S_2, S_3, \ldots S_n$) are generated by applying the same component or function as for the encryption, for example the key schedule function (KSF) on a string (S) obtained by adding the last ciphered block ($C_N$) to the encryption key (K), $S=C_N \oplus K$ (XOR operation). The length of the round keys ($S_1, S_2, S_3, \ldots S_n$) is preferably equal to the length of the ciphered blocks of the sequence SEQC.

These round keys ($S_1, S_2, S_3, \ldots ; S_n$) are combined together, i.e. successive addition (XOR operations) on all or part of the round keys ($S_1, S_2, S_3, \ldots ; S_n$) to obtain a string $ST=S_1 \oplus S_2 \oplus S_3 \oplus \ldots S_n$ having a length equal to the length of a block, To obtain the plaintext residual block PR, the residual ciphered block (CR) is added to the most left bits of the string ST forming a string T having a length of y bits equal to the length of the residual ciphered block (CR), $PR=CR \oplus T$.

As in the preceding embodiment, the pre-processing module thus outputs a sequence SEQP of N plaintext blocks ($P_1, P_2, P_3, \ldots, P_N$) followed by the plaintext residual block PR.

EXAMPLE

For example, the method of the invention may be applied by using AES-128 (Advanced Encryption Standard, with blocks of 128 bits) encryption/decryption algorithm in CBC mode with key K and initialization vector IV, when (for example) plaintext blocks are $P_1, P_2$ and $P_3$ such that $P_1$ and $P_2$ have a length of 128 bits, and P3 as residual plaintext block with a length of 32 bits, are encrypted as follows 1. Given an initialization vector IV, ciphered blocks of 128 bits are produced as follow:
   a. $C_1$=AES-128_Enc(K, $P_1$ XOR IV) and
   b. $C_2$=AES-128_Enc(K, $P_2$ XOR $C_1$)
2. A 128 bit string S is formed by XORing the last ciphered block of 128 bits $C_2$ and the key K. The key schedule function KSF of AES-128 algorithm is used to determine the 11 round keys ($S_1, S_2, S_3, \ldots S_{11}$) corresponding to the string S. These 11 round keys of 128 bits strings are XORed together to obtain a resulting string $ST=S_1 \oplus S_2 \oplus S_3 \oplus \ldots \oplus S_{11}$, and the first 32 bits of the resulting string ST are saved as a string T.
3. The residual ciphered block C3 of 32 bits is obtained by $P_3$ XOR T, and the sequence SEQC of ciphered 128 bits blocks $C_1 C_2$ followed by the residual ciphered block $C_3$ is returned.

Further Embodiments

According to a further embodiment, the method of the invention may be personalized by adding at least one constant X with the rounds keys issued from the encryption key K, for example $ST'=K_1 \oplus K_2 \oplus K_3 \oplus \ldots K_n \oplus X$ or from the combination ($S=K \oplus C_N$) of the encryption key K with the last ciphered block $C_N$, i.e. $ST'=S_1 \oplus S_2 \oplus S_3 \oplus \ldots S_n \oplus X$. The length of the constant X corresponds to the length of a round key.

The constant X may be any number in form of a binary string stored for example in a memory of the pre-processing module corresponding to particulars of a device comprising the pre-processing module. For example, the constant may consist of a serial number of a device performing blocks encryption/decryption, such as a television set top box, a number associated to a client or user of the device, a number associated to a particular product, a temporal information such as a date and time, a device location code, etc. In order to perform the addition operation (XOR) of the constant X, the system of the invention further comprises an appropriate hardware/software module.

The constant X may also be combined by addition to the main encryption key K before applying the key schedule function (KSF), as for example: $K'=K \oplus X$ or $S'=K \oplus C_N \oplus X$ in the embodiment using CBC algorithm. The length of the constant X corresponds in this case to the length of the encryption key K' or S'. The key schedule function is then applied on the resulting key K', respectively S'. As in the preceding embodiment, the system of the invention further comprises an appropriate hardware/software module configured to perform the addition operation (XOR) of the constant X.

The constant X may also be combined (XORed) with the string T obtained after truncation of the string ST. Depending on the length of the string T equal to the length of the residual block, the constant may, if necessary, also be truncated so that the number of most left bits is equal to the number of bits of the string T or of the residual block.

In the embodiment of the method involving CBC mode, the constant may correspond to the initial vector IV used to encrypt or decrypt the first block.

It has to be noted that the same constant or a different constant may be combined to the round keys and/or to the encryption key (K, S) and/or to the string T and/or to the first block as initialization in a same encryption or decryption process. For example, a device serial number may be used as initialization vector and/or a product number may be combined with the round keys and/or a truncated user number may be combined with the string T.

The invention claimed is:

1. A method for encrypting plaintext digital data divided into a sequence comprising successive plaintext blocks of a same length and a residual plaintext block having a length less than the length of one of the successive plaintext blocks, the method comprising preliminary step of:
   a) inputting, by an electronic processor, the sequence of successive plaintext blocks into a pre-processing module comprising at least a ciphering module, an addition module, registers and a memory containing a main encryption key, the addition module applying a logical exclusive OR (XOR) operation carried out bitwise;
   b) ciphering the successive plaintext blocks with the main encryption key by using an encryption algorithm based on a cipher block chaining mode where the first block is added to an initialization vector and each following plaintext block is added to the preceding ciphered block before being encrypted with the main encryption key, to obtain a sequence of successive ciphered blocks each of the same length as one of the successive plaintext blocks;
   c) generating a set of round keys having a same length by applying a key schedule function on a string obtained by adding the last ciphered block to the main encryption key;
   d) adding together by the addition module all or part of the round keys of the set, to obtain a resulting string having a length equal to the length of a block;
   e) adding to the residual plaintext block the most significant bits of the resulting string forming a string having a length equal to the length of the residual block, to obtain a residual ciphered block;
   f) outputting the sequence of successive ciphered blocks, including the previously obtained successive ciphered blocks followed by the residual ciphered block.

2. The method according to claim 1, wherein the initialization vector corresponds to a constant associated with particulars of a device comprising the pre-processing module.

3. The method according to claim 1, wherein at least one constant associated with particulars of a device comprising the pre-processing module is added to the resulting string or the main encryption key.

4. The method according to claim 1, wherein at least one constant associated with particulars of a device comprising the pre-processing module is added to the to the main encryption key or to the main encryption key added to the last ciphered block before applying the key schedule function.

5. A method for decrypting a sequence of successive ciphered blocks having a same length followed by a residual ciphered block having a length less than the length of one of the successive ciphered blocks comprising the steps of:
   a) inputting, by an electronic processor, the sequence of successive ciphered blocks into a pre-processing module comprising at least a deciphering module, an addition module, registers and a memory containing a main encryption key;
   b) deciphering the successive ciphered blocks with the main encryption key by using a cipher block chaining mode and a predefined encryption algorithm, to obtain a sequence of successive plaintext blocks each of the same length as one of the ciphered blocks;
   c) generating a set of round keys having a same length by applying a key schedule function on a string obtained by adding the last ciphered block to the encryption key;
   d) adding together by the addition module all or part of the round keys of the set, to obtain a resulting string having a length equal to the length of a block;
   e) adding to the residual ciphered block the most significant bits of the resulting string forming a string having a length equal to the length of the residual ciphered block, to obtain a residual plaintext block;
   f) outputting the sequence of successive plaintext blocks, including the previously obtained successive plaintext blocks followed by the residual plaintext block.

6. The method according to claim 5, wherein an initialization vector is added to the first ciphered block and the initialization vector corresponds to a constant associated with particulars of a device comprising the pre-processing module.

7. The method according to claim 5, wherein at least one constant associated with particulars of a device comprising the pre-processing module is added to the resulting string or the main encryption key.

8. The method according to claim 5, wherein at least one constant associated with particulars of a device comprising the pre-processing module is added to the to the main encryption key or to the main encryption key added to the last ciphered block before applying the key schedule function.

9. A system configured to encrypt plaintext digital data divided into a sequence comprising successive plaintext blocks of a same length and a residual plaintext block having a length less than the length of one of the successive plaintext blocks, comprising:
   a) a pre-processing module comprising at least a ciphering module including an electronic processor, an addition module, registers and a memory containing a main encryption key, the preprocessing module being adapted to receive the sequence of successive plaintext blocks at an input, the addition module applying a logical exclusive OR (XOR) operation carried out bitwise;
   b) the ciphering module being configured to cipher the successive plaintext blocks with the main encryption key by using an encryption algorithm based on a cipher block chaining mode where the first plaintext block is added to an initialization vector and each following plaintext block is added to the preceding ciphered block before being encrypted with the main encryption key, to obtain a sequence of successive ciphered blocks each of the same length as one of the successive plaintext blocks;
   c) a generator being configured to generate a set of round keys having a same length by applying a key schedule function on a string obtained by adding the last ciphered block to the main encryption key;
   d) the addition module being configured to add together all or part of the round keys of the set to obtain a resulting string having a length equal to the length of a block;
   e) and to add the residual plaintext block to the most significant bits of the resulting string forming a string having a length equal to the length of the residual block to obtain a residual ciphered block;
   f) the pre-processing module being further configured to produce the sequence of successive ciphered blocks, including the successive ciphered blocks followed by the residual ciphered block at an output.

10. The system according to claim 9, wherein the initialization vector corresponds to a constant associated with particulars of a device comprising the pre-processing module.

11. The system according to claim 9, further comprising a hardware/software module configured to add at least one constant associated with particulars of a device comprising the pre-processing module to the resulting string or the main encryption key.

12. The system according to claim 9, further comprising a hardware/software module configured to add at least one constant associated with particulars of a device comprising the pre-processing module to the to the main encryption key to the main encryption key added to the last ciphered block before applying the key schedule function.

13. A system configured to decrypt a sequence of successive ciphered blocks having a same length followed by a residual ciphered block having a length less than the length of one of the successive ciphered blocks comprising:
   a) a pre-processing module comprising at least a deciphering module including an electronic processor, an addition module, registers and a memory containing a main encryption key, said pre-processing module being adapted to receive the sequence of successive ciphered blocks at an input;
   b) the deciphering module being configured to decipher the successive ciphered blocks with the main encryption key by using a decryption algorithm based on a cipher block chaining mode, to obtain a sequence of successive plaintext blocks each of the same length as one of the ciphered blocks;
   c) a generator being configured to generate a set of round keys having a same length by applying a key schedule function on a string obtained by adding the last ciphered block to the main encryption key;
   d) the addition module being configured to add together all or part of the round keys of the set, to obtain a resulting string having a length equal to the length of a block; and to add to the residual ciphered block the most significant bits of the resulting string forming a string having a length equal to the length of the residual ciphered block, to obtain a residual plaintext block; and
   e) the pre-processing module being further configured to produce the sequence of successive plaintext blocks, including the successive plaintext blocks followed by the residual plaintext block at an output.

14. The system according to claim 13, wherein an initialization vector is added to the first ciphered block and the initialization vector corresponds to a constant associated with particulars of a device comprising the pre-processing module.

15. The system according to claim 13, further comprising a hardware/software module configured to add at least one constant associated with particulars of a device comprising the pre-processing module to the resulting string or the main encryption key.

16. The system according to claim 13, further comprising a hardware/software module configured to add at least one constant associated with particulars of a device comprising the pre-processing module to the to the main encryption key or to the main encryption key added to the last ciphered block before applying the key schedule function.

* * * * *